2,813,864

NEW OPTICAL BLEACHING AGENTS AND PROCESSES FOR THE PREPARATION THEREOF

Rene Maurice Henri Vanier de Saint Aunay and Maurice Louis Lefebvre, Creil, France, assignors to Compagnie Francaise des Matieres Colorantes, Paris, France, a French company No Drawing. Application June 22, 1956,
Serial No. 593,035

Claims priority, application France June 24, 1955

9 Claims. (Cl. 260—249.6)

The present invention relates to new optical bleaching agents and processes for the preparation thereof.

The new optical bleaching agents have the following general formula:

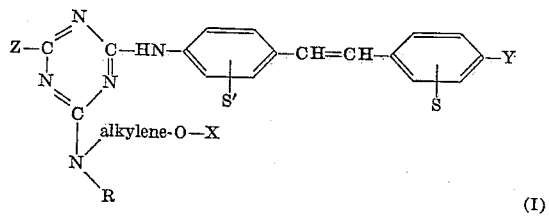

in which R represents the residue of any carboxylic acid or a salt of such acid, S and S' represent hydrogen atoms or solubilising groups, such as for example, sulphonic or carboxylic groups, X represents a hydrogen atom, an alkyl or hydroxyalkyl group, Y represents an acylamino, ureido, or triazinylamino group, Z represents a hydroxy, alkoxy, aryloxy, or amino group, or an atom of halogen. When we refer to the "ureido group" we intend to include the unsubstituted ureido group —NH—CO—NH$_2$ and substituted ureido groups, such as —NH—CO—NH-aryl; by "triazinylamino group" we mean a group of the general formula:

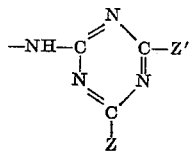

in which Z and Z' represent halogen atoms or hydroxy, alkoxy, aryloxy or amino groups; and by "amino group" we mean to include both the unsubstituted —NH$_2$ group and substituted amino groups.

The new optical bleaching agents may be obtained by various principal methods.

According to the first method amines of the general formula:

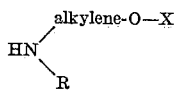

in which X and R have the meanings given above are reacted with the products resulting from the condensation of a molecule of a 4:4'-diaminostilbene, containing or not containing solubilising groups, with two molecules of cyanuric chloride or bromide.

One may also condense a molecule of a 4:4'-diaminostilbene, containing solubilising groups or not, with two molecules of cyanuric chloride or bromide, condense the product thus obtained with 1, 2 or 3 molecules of an amine of the general Formula (II) and subject the products resulting from this second condensation to hydrolysis or to the action of ammonia so as to replace the remaining halogen atoms by OH or NH$_2$ groups.

Furthermore a molecule of a 4-amino-4'-nitrostilbene, containing solubilising groups or not, may be condensed with a molecule of cyanuric chloride or bromide, one of the halogen atoms being replaced by a group:

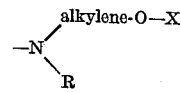

and, if preferred, the other replaced by an OH or NH$_2$ group, then the NO$_2$ group is reduced to NH$_2$, and finally condensed with an acid chloride, an isocyanate or a cyanuric halide; in the latter case, the remaining atoms of halogen may then be replaced by hydroxy, alkoxy, aryloxy, amino or substituted amino groups. The method indicated in the present paragraph permits asymmetric derivatives to be obtained; they may therefore be obtained from 4-amino-4'-acylaminostilbene containing solubilising groups or not.

One or two molecules of one or two amines of the general Formula II may in turn be condensed with a molecule of cyanuric chloride or bromide, if preferred, one of the atoms of chlorine or bromine remaining on the cyanuric nucleus being replaced by any organic residue, provided an atom of chlorine or bromine is allowed to remain on said nucleus, two molecules of the component thus obtained being condensed with a molecule of a 4:4'-diaminostilbene containing solubilising groups or not.

The new compounds of the present invention are preferably used in the form of their alkaline salts, in solution in water, as optical bleaching agents for all materials capable of being brightened by such treatment. Natural textile fibres, cotton in particular, are greatly improved. It is the same with certain synthetic fibres such as nylon. The new compounds may be applied without any limitations to, for example, celluloses, regenerated or not, paper, artificial and vegetable fibres, light hides, threads and films of all kinds, and straw.

The invention will be more clearly understood by reference to the following examples, in which the parts mentioned are parts by weight, which are purely illustrative.

Example 1

To a neutral aqueous solution of 414 parts of the sodium salt of 4:4'-diaminostilbene-2:2'-disulphonic acid cooled down to 0–5° C., there are added with stirring, 370 parts of cyanuryl chloride (or the corresponding quantity of cyanuryl bromide) dissolved in 1110 parts of acetone. The pH of the reaction medium is kept between 5 and 6 by simultaneous addition of a sufficient quantity of a 10% aqueous solution of sodium carbonate. This first stage is terminated when there is no further free 4:4'-diaminostilbene-2:2'-disulphonic acid in the reaction medium. In this manner 710 parts of sodium N:N' - bis - (2":4"- dichloro - 1":3":5"- triazinyl)-4:4'-diaminostilbene-2:2'-disulphonate are obtained.

The temperature is raised to 20° C. and 970 parts of an aqueous solution, containing 240 parts of 100% hydroxyethylamino acetic acid, and 2120 parts of a 10% aqueous solution of sodium carbonate, are simultaneously introduced in one hour into the reaction medium.

The N:N'-bis (2"-N"-ethanoic-hydroxyethylamino-4"-chloro - 1":3":5" - triazinyl) - 4:4' - diaminostilbene-2:2'-disulphonic acid precipitates by addition to the cooled solution of a sufficient quantity of mineral acid. It is drained, converted into sodium salt by mixture with sodium carbonate and dried at 60° C. Finally an excellent yield of a clear yellow powder which is very soluble in water is obtained of the formula:

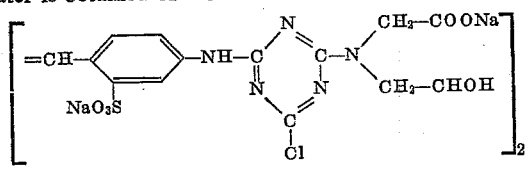

*Example 2*

If the product obtained in the preceding example is treated with 1060 parts of a 10% solution of sodium carbonate at the boil for two hours, then two chlorine atoms on the triazine nuclei are replaced by two hydroxyl groups. By operating as in Example 1 a clear yellow powder which is very soluble in water is obtained of the formula:

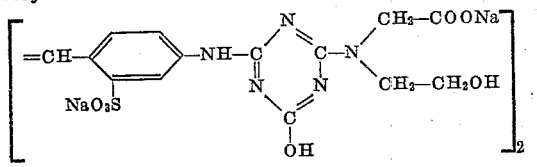

*Example 3*

A solution containing 919 parts of the sodium salt of N:N' - bis(2" - N" - ethanoic-hydroxyethylamino - 4"-chloro - 1":3":5" - triazinyl) - 4:4' - stilbene - 2:2' - disulphonic acid obtained in Example 1, is treated with 780 parts of a 20% ammonia solution under reflux at 85° C. for 5 hours; then, after cooling, the same procedure is effected as in Example 1. 880 parts of a bright yellow powdery product which is very soluble in water are obtained of the formula:

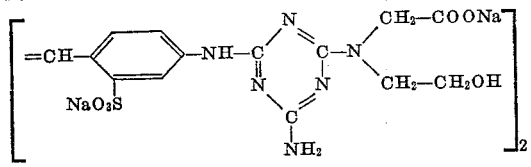

*Example 4*

In Example 3, the ammonia solution is replaced by 122 parts of hydroxyethylamine and the heating is for 5 hours at 85° C., the pH of the reaction medium being maintained alkaline to phenolphthalein by the addition in sufficient quantity of a 10% solution of sodium carbonate. After cooling, the sodium salt of N:N'-bis-(2"N"-ethanoic-hydroxyethylamino - 4" - hydroxyethylamino - 1":3":5" - triazinyl) - 4:4' - diaminostilbene - 2:2' - disulphonic acid is isolated according to the method used in Example 1. A clear yellow powder which is very soluble in water is finally obtained in very good yield and having the formula:

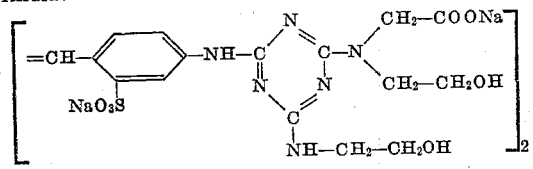

We claim:
1. Optical bleaching agents of the general formula:

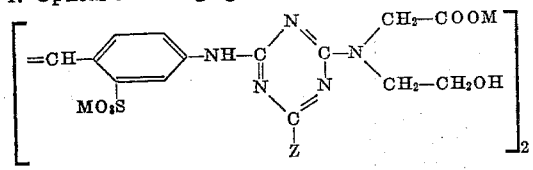

in which M represents a monovalent cation selected from the group consisting of H and alkali metal atoms and Z represents a member selected from the group consisting of chlorine, bromine, —OH, —NH₂ and
—NH—CH₂—CH₂OH.groups 2. Optical bleaching agent of the formula:

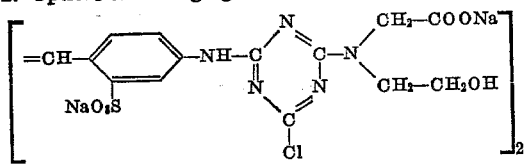

3. Optical bleaching agent of the formula:

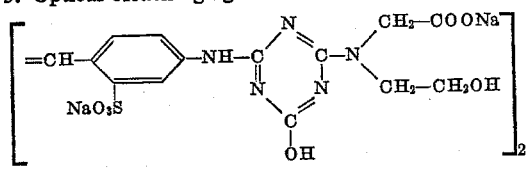

4. Optical bleaching agent of the formula:

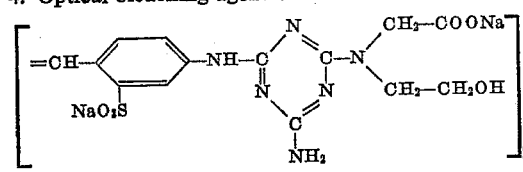

5. Optical bleaching agent of the formula:

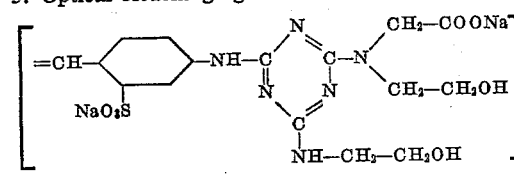

6. Process for the preparation of optical bleaching agents which comprises condensing two molecules of a member selected from the group consisting of cyanuric chloride and cyanuric bromide on the one hand with a molecule of a member selected from the group consisting of 4:4'-diaminostilbene-2:2'-disulphonic acid and the salts of said acid on the other hand, with two molecules of an amine of the general formula:

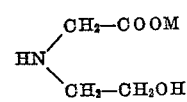

in which M represents a monovalent cation selected from the group consisting of H and alkali metal atoms.

7. Process for the preparation of optical bleaching agents which comprises condensing two molecules of a member selected from the group consisting of cyanuric chloride and cyanuric bromide on the one hand with a molecule of a member selected from the group consisting of 4:4'-diaminostilbene-2:2'-disulphonic acid and the salts of said acid on the other hand, with two molecules of an amine of the general formula:

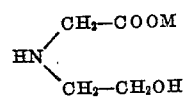

in which M represents a monovalent cation selected from the group consisting of H and alkali metal atoms and hydrolysing the product obtained.

8. Process for the preparation of optical bleaching agents which comprises condensing two molecules of a member selected from the group consisting of cyanuric chloride and cyanuric bromide on the one hand with a molecule of a member selected from the group consisting of 4:4'-diaminostilbene-2:2'-disulphonic acid and the salts of said acid on the other hand, with two molecules of an amine of the general formula:

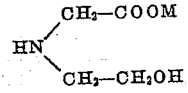

in which M represents a monovalent cation selected from the group consisting of H and alkali metal atoms and reacting the product obtained with ammonia.

9. Process for the preparation of optical bleaching agents which comprises condensing two molecules of a member selected from the group consisting of cyanuric chloride and cyanuric bromide on the one hand with a molecule of a member selected from the group consisting of 4:4'-diaminostilbene-2:2'-disulphonic acid and the salts of said acid on the other hand, with two molecules of an amine of the general formula:

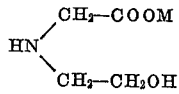

in which M represents a monovalent cation selected from the group consisting of H and alkali metal atoms and reacting the product obtained with hydroxyethylamine.

No references cited.